UNITED STATES PATENT OFFICE 2,656,387

FLUORENE DERIVATIVES

James F. Kerwin and Glenn E. Ullyot, Philadelphia, Pa., assignors to Smith, Kline & French Laboratories, Philadelphia, Pa., a corporation of Pennsylvania No Drawing. Application February 23, 1950, Serial No. 145,888

6 Claims. (Cl. 260—570.7)

This invention relates to certain new chemical compounds which are of value by virtue of the fact that they possess physiological properties and, more particularly, possess adrenolytic or sympatholytic properties.

The compounds according to this invention are, broadly speaking, $\beta$-haloethylamines in which the nitrogen is linked to fluorene in the 9 position.

Broadly speaking, the new compounds in accordance with this invention will have the following structure.

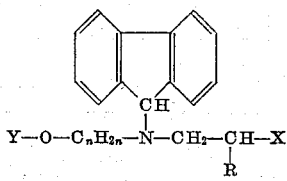

in which:

Y is a member of the group consisting of alkyl groups of not in excess of 4 carbon atoms, phenyl, tolyl and anisyl;

$n$ is an integer from the group consisting of 2 and 3;

R is a member of the group consisting of hydrogen and methyl;

X is a member of the group consisting of chlorine and bromine.

This invention also contemplates the salts of the above compounds formed with inorganic acids, as, for example, sulfamic, hydrochloric, hydrobromic, sulfuric, phosphoric, nitric, etc., and with organic acids, as, for example, tartaric, oxalic, succinic, glycolic, camphorsulfonic, maleic, etc. More specifically, such salts may preferably be formed with organic and inorganic acids which have an ionization constant of not less than $1 \times 10^{-2}$ at 18° C.

Generally speaking, any of the compounds in accordance with this invention as defined by the above structural formula will be produced by the preparation of a 9-($\beta$-hydroxyethylamino) fluorene by interacting 9-bromofluorene with an N-monosubstituted amino alcohol and replacing the hydroxyl group in the 9-($\beta$-hydroxyethyl amino) fluorene group by any well known procedure for replacing a hydroxyl group by a halogen; as for example, interacting the hydroxy compound with a thionyl halide or with a halogen acid.

As more specifically illustrative of procedures generally applicable for making the compounds included within the structural formula given above, 9-bromofluorene and an amino alcohol are mixed and heated together until reaction is complete. The use of an excess of amino alcohol is desirable in order to remove hydrogen bromide, which is formed as a by-product of the reaction. If desired, a suitable solvent may be used, such as benzene, alcohol, or the like. Again, instead of using an excess of amino alcohol, the reaction may be carried out in the presence of an alkaline reagent, such as sodium bicarbonate, a tertiary amine, such as dimethylaniline, diethylaniline, or the like.

On completion of the reaction, the product may be recovered by distillation or by effecting the formation of a hydrohalide salt and recrystallizing. The reaction will be made apparent by the following:

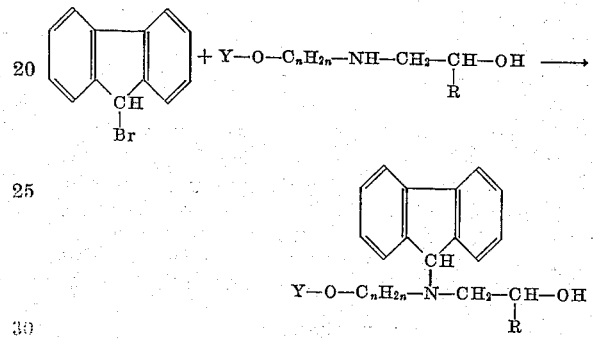

In the above formula illustrative of the reaction for the production of the compounds in accordance with this invention and hereinafter Y and R are as indicated in connection with the above structural formula for the compounds according to this invention, it being obvious that for the preparation of compounds in accordance with this invention the particular amino alcohol for reaction with 9-bromofluorene will be selected with consideration for the particular compound to be produced.

A 9-($\beta$-hydroxyethylamino) fluorene having been prepared as described above, replacement of the hydroxyl group with a halogen group, as chlorine or bromine will be effected in any well known manner, as by reaction with a thionyl halide, or with a halogen acid.

For the preparation of 9-($\beta$-hydroxyethylamino) fluorenes for the preparation of compounds in accordance with this invention, a wide variety of amino alcohols may be used for reaction with 9-bromofluorene, many of which have been reported in the literature and others of which, given their structure as above, may be readily prepared by well known methods. Thus by way of example the following amino alcohols may be used:

N-(γ-methoxypropyl) ethanolamine
N-(β-ethoxyethyl) ethanolamine
N-(β-butoxyethyl) ethanolamine
N-(β-phenoxyethyl) ethanolamine
N-(β-phenoxyisopropyl)-ethanolamine
N-(β-phenoxyisopropyl)-1-amino-2-propanol
N-[β-(o-toloxy) ethyl] ethanolamine
N-[β-(p-anisyl) ethyl] ethanolamine As an alternative procedure for the preparation of compounds in accordance with this invention, 9-bromofluorene may be reacted with ethanolamine or 1-amino-2-propanol in a solvent such as, for example, benzene or alcohol, preferably with an excess of the reacting amine. The N-(9-fluorenyl) aminoethanol or corresponding propanol thus formed is then reacted with an alkoxyalkyl halide or aryloxyalkyl halide of the type YOC$_n$H$_{2n}$X in an inert solvent such as toluene or xylene, in the presence of an acid-binding agent which may comprise an excess of the reacting amine or other added agent such as potassium carbonate, sodium bicarbonate, and the like. The reaction of the alternate procedure will be made apparent by the following:

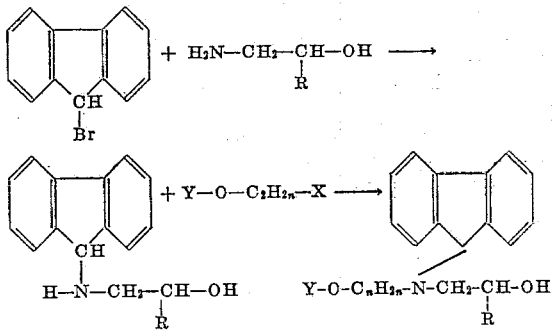

The following specific examples will be illustrative of compounds in accordance with this invention and procedure for their preparation and will serve, together with the foregoing, to make apparent to those skilled in the art the preparation of all compounds in accordance with this invention having the structure hereinbefore indicated.

EXAMPLE 1

*N-(γ-methoxypropyl)-N-(9-fluorenyl)-β-chloroethylamine hydrochloride*

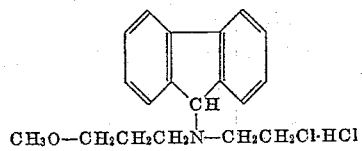

CH$_3$O—CH$_2$CH$_2$CH$_2$N—CH$_2$CH$_2$Cl·HCl

One mole of γ-methoxypropyl chloride is added to three moles of ethanolamine at 140–150° over a two hour period. Upon completion of the addition, heating is continued for another two hours and the mixture is diluted with water and extracted with chloroform. On distillation of the chloroform solution N-(γ-methoxypropyl) ethanolamine, B. P. 90–93°/5 mm. is obtained.

A solution of 20 g. of N-(γ-methoxypropyl)-ethanolamine and 18.4 g. of 9-bromofluorene dissolved in 100 cc. of dry benzene is refluxed for 2 hours. The solution is concentrated to approximately 60 cc. and the remainder refluxed one hour. Ether is added to the cooled solution and the solution is decanted from the hydrobromide oil, washed three times with water, and dried over potassium carbonate. The hydrochloride salt is prepared and the solid tertiary aminoalcohol is crystallized from alcohol-ether, M. P. 149.5–151.5° C.

A solution of 4.8 g. of thionyl chloride in 10 cc. of chloroform is added slowly to a solution of 11 g. of the N-(9-fluorenyl)-N-(γ-methoxypropyl)-aminoethanol hydrochloride prepared above in 50 cc. of chloroform, while the solution is cooled in an ice bath. The solution is then refluxed on a water bath for three hours. The solvent is removed under reduced pressure leaving an oil which solidifies when stirred with ether. The solid, N-(γ-methoxypropyl)-N-(9-fluorenyl)-β-chlorethylamine hydrochloride is collected and crystallized three times from alcohol-ether, M. P. 146–9° C.

EXAMPLE 2

*N-(β-ethoxyethyl)-N-(9-fluorenyl)-β-chloroethylamine hydrochloride*

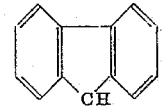

C$_2$H$_5$—O—CH$_2$CH$_2$—N—CH$_2$CH$_2$Cl·HCl

This will be prepared in the manner described for the preparation of Example 1, using ethoxyethyl bromide as starting material. By addition of this halide to ethanolamine at 130–140°, dilution with water and repeated extraction with ether, N-(β-ethoxyethyl) ethanolamine is formed. Two molar equivalents of the amine are heated with one molar equivalent of 9-bromofluorene in benzene solution for two hours. The cooled mixture is diluted with ether and filtered, and the filtrate treated with hydrogen chloride gas to obtain N-(β-ethoxyethyl)-N-(9-fluorenyl) ethanolamine hydrochloride. A solution of the salt in chloroform is refluxed with thionyl chloride to form the final product.

EXAMPLE 3

*N-(β-butoxyethyl)-N-(9-fluorenyl)-β-chloroethylamine hydrochloride*

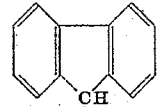

C$_4$H$_9$—O—CH$_2$CH$_2$—N—CH$_2$CH$_2$Cl·HCl

This compound will be prepared in the manner described in the preparation of Example 1. β-butoxyethyl bromide is employed to alkylate ethanolamine and the resulting N-(β-butoxyethyl) ethanolamine is reacted with 9-bromofluorene. Finally, the hydroxyl group is replaced, by means of thionyl chloride in chloroform solution, with chlorine to form the product, N-(β-butoxyethyl)-N-(9-fluorenyl)-β-chloroethylamine hydrochloride.

EXAMPLE 4

*N-(β-phenoxyethyl)-N-(9-fluorenyl)-β-chloroethylamine hydrochloride*

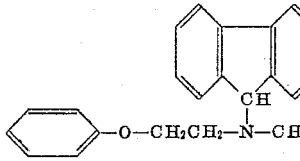

>—O—CH$_2$CH$_2$—N—CH$_2$CH$_2$Cl·HCl

A solution of 10 g. of 9-bromofluorene and 14.8 g. of N-(phenoxyethyl) aminoethanol dissolved in 40 cc. of dry benzene is refluxed for 2½ hours. One hundred cc. of ether is added and the mixture is filtered, washing the hydrobromide salt with ether. Dry hydrogen chloride is passed through the filtrate forming a solid compound which is crystallized from alcohol, M. P. 160–162.5° C.

A solution of 4.7 g. of thionyl chloride dissolved in 10 cc. of dry chloroform is added to a cooled suspension of 10.5 g. of N-(9-fluorenyl)-N-(phenoxyethyl) aminoethanol hydrochloride (prepared above) in 80 cc. of dry chloroform. The solution is refluxed for three hours. The chloroform is removed under reduced pressure leaving a solid residue which is crystallized twice from alcohol to yield a product with a M. P. of 167–9° C.

EXAMPLE 5

N - (β - phenoxyisopropyl) - N - (9 - fluorenyl) - β - chloroethylamine hydrochloride

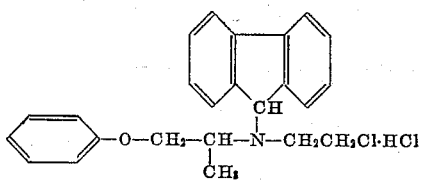

One mole of 1-phenoxy-2-chloropropane, prepared from 1-phenoxy-2-propanol and thionyl chloride, is added over a two hour interval to three moles of boiling ethanolamine. The mixture is refluxed for three hours, diluted with water, and extracted with ether. The ether solution is then extracted with dilute acid, the acid extract made basic and the product taken up into ether. Removal of the ether leaves N-(β-phenoxyisopropyl) ethanolamine, which is recrystallized from petroleum ether.

48 gms. of N-(β-phenoxyisopropyl) ethanolamine is refluxed for six hours with a solution of 30.8 gms. of 9-bromofluorene in 150 ml. of benzene. The resulting solution is poured into water and the water extract separated, this procedure being repeated twice, followed by boiling of the organic layer to eliminate the water. The residue is diluted with ether and dry hydrogen chloride is introduced into the solution. The resulting oil which slowly crystallizes provides a precipitate which is recrystalized from ethanol and ether to yield a colorless crystalline product melting at 168–9° C.

A solution of 29.6 gms. of N-phenoxyisopropyl-N-(9-fluorenyl) aminoethanol hydrochloride and 10.7 gms. thionyl chloride in 100 ml. of chloroform is warmed at 35° for ½ hour and then refluxed for 2½ hours. Upon removal of the solvent under reduced pressure there remains an oily residue which is covered with ether and allowed to stand overnight. The salt which solidifies is recrystallized from alcohol and ether to provide a product which melts at 150–1° C.

EXAMPLE 6

N - (β - phenoxyisopropl) - N - (9 - fluorenyl) - 1 - amino - 2 - chloropropane hydrochloride

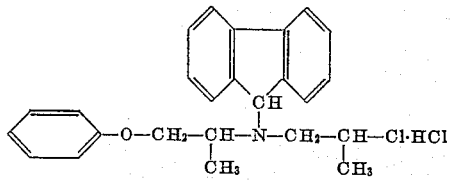

1-phenoxy-2-chloropropane is added to boiling 1-amino-2-propanol and the mixture is refluxed for three hours to prepare the N-(β-phenoxyisopropyl)-1-amino-2-propanol in a manner identical with that described in Example 5.

The 9-fluorenyl group is introduced into the molecule by refluxing a solution of 2 molar equivalents of N-(β-phenoxyisopropyl)-1-amino-2-propanol with one molar equivalent of 9-bromofluorene in benzene solution. The hydrobromide salt of the starting amino alcohol is filtered off and hydrogen chloride gas is introduced into the filtrate to obtain N-(β-phenoxyisopropyl)-N-(9-fluorenyl)-1-amino-2-propanol hydrochloride. This salt is then refluxed with thionyl chloride in chloroform solution to form the end product.

EXAMPLE 7

N - [β - (o - toloxy) ethyl] - N - (9 - fluorenyl) - β - chloroethylamine hydrochloride

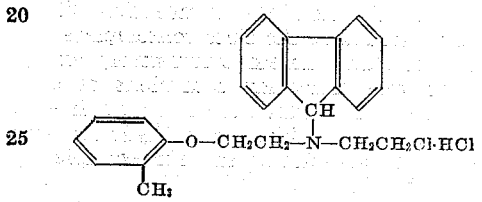

A solution of one mole of N-[β-(o-toloxy)-ethyl]ethanolamine and one-half mole of 9-bromofluorene in 750 cc. of benzene is refluxed for 2½ hours as in Example 4. The mixture is diluted with ether, filtered and the filtrate is treated with hydrogen chloride gas to form the N - [β - (o - toloxy) ethyl] - N - (9 - fluorenyl) - ethanolamine hydrochloride. This salt and an equimolar quantity of thionyl chloride are heated in refluxing chloroform solution to form the β-chloroethylamine hydrochloride product.

EXAMPLE 8

N-[β-(p-anisyloxy) ethyl]-N-(9-fluorenyl)-β-chloroethylamine hydrochloride

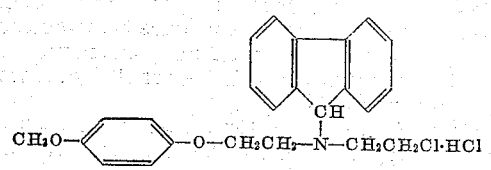

Using N-[β-(p-anisyloxy) ethyl]ethanolamine as starting material, the procedure of Example 4 will be followed to form this compound.

EXAMPLE 9

N-(β-phenoxyethyl)-N-(9-fluorenyl) - β - bromoethylamine hydrobromide

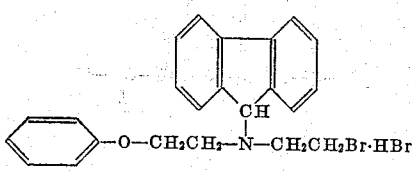

N-(β-phenoxyethyl)-N-(9 - fluorenyl)ethanolamine, an intermediate in the preparation of Example 4, and one molar equivalent of thionyl bromide are refluxed in chloroform solution for two hours. The chloroform is removed under reduced pressure and the residue is recrystallized from alcohol and ether.

In the foregoing examples hydrochlorides and hydrobromides according to this invention are exemplified. However, it will be understood and readily appreciated by those skilled in the art that the foregoing examples will illustrate organic or inorganic salts generally and will serve as specific examples of those organic and inorganic salts heretofore mentioned specifically by the substitution in the several foregoing illustrative structures of any of the acid groups heretofore specifically mentioned or the acid group of any other desired organic or inorganic acid for the HCl or HBr in the several foregoing examples, respectively.

The foregoing examples illustrate the salts contemplated by this invention. The bases contemplated by this invention according to the broad and more particular structural formulae herein disclosed are specifically exemplified as will be obvious to anyone skilled in the art by reference to the foregoing specific examples with the removal from the structure illustrated thereby of the acid group, i. e., HCl or HBr.

The bases contemplated by this invention will be formed by interacting the salts contemplated by this invention and herein exhaustively exemplified with one molecular equivalent of a strong alkali such, for example, as sodium hydroxide, potassium hydroxide, lithium hydroxide, or the like, in aqueous solution say, for example, a 10%–40% solution.

The compounds contemplated by this invention will be variously optically inactive or optically active and it will be understood that the optically inactive and optically active forms of the compounds contemplated by this invention are all included within the scope of this invention.

The various types of compounds having the structure embodying this invention as illustrated by the above specific examples and examples of the various types of compounds will be readily prepared by the general method of preparation described above as amplified by the description of preparation of the several specific examples. The starting material for the preparation of any given compound within the structure contemplated by this invention will be found among known compounds, or, its structure being obvious with reference to any particular compound desired to be prepared, will be readily prepared by known methods.

This application is a continuation in part of our application Serial No. 29,950, filed May 28, 1948, now abandoned.

What is claimed is:

1. A compound of the class consisting of a free base and its acid addition salts, said free base having the structure

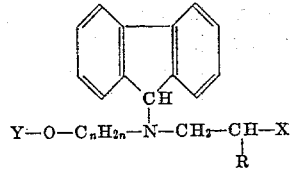

in which Y is a member of the group consisting of alkyl groups of not in excess of 4 carbon atoms, phenyl, tolyl and anisyl; $n$ is an integer from the group consisting of 2 and 3; R is a member of the group consisting of hydrogen and methyl; X is a member of the group consisting of chlorine and bromine.

2. A compound having the structure

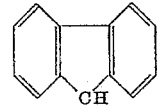

3. A compound having the structure

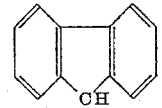

4. A compound having the structure

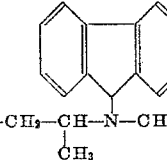

5. A compound having the structure:

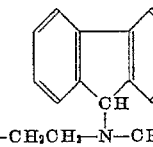

6. A compound having the structure:

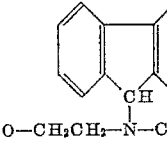

JAMES F. KERWIN.
GLENN E. ULLYOT.

No references cited.